United States Patent
Islam et al.

(10) Patent No.: US 11,381,346 B2
(45) Date of Patent: Jul. 5, 2022

(54) PRIORITIZATION OF SERVICES FOR CONTROL AND DATA TRANSMISSION FOR NEW RADIO SYSTEMS

(71) Applicant: Intel Corporation, Santa Clara, CA (US)

(72) Inventors: Toufiqul Islam, Santa Clara, CA (US); Debdeep Chatterjee, San Jose, CA (US); Sergey Panteleev, Nizhny Novgorod NIZ (RU); Fatemeh Hamidi-Sepehr, Milpitas, CA (US); Gang Xiong, Portland, OR (US); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 16/833,149

(22) Filed: Mar. 27, 2020

(65) Prior Publication Data

US 2020/0228248 A1 Jul. 16, 2020

Related U.S. Application Data

(60) Provisional application No. 62/843,142, filed on May 3, 2019, provisional application No. 62/828,338, filed on Apr. 2, 2019.

(51) Int. Cl.
*H04L 1/18* (2006.01)
*H04W 72/12* (2009.01)
(Continued)

(52) U.S. Cl.
CPC .......... *H04L 1/1812* (2013.01); *H04L 1/1854* (2013.01); *H04L 5/0055* (2013.01); *H04W 72/042* (2013.01); *H04W 72/1284* (2013.01)

(58) Field of Classification Search
CPC ... H04L 1/1812; H04L 1/1854; H04L 5/0055; H04W 72/042; H04W 72/1284
See application file for complete search history.

(56) References Cited

U.S. PATENT DOCUMENTS 9,191,930 B2 11/2015 Papasakellariou
10,966,234 B2 * 3/2021 Li .................. H04L 5/0055
(Continued)

FOREIGN PATENT DOCUMENTS

DE    202008018244 U1    4/2012
WO    WO-2018064583 A1 *  4/2018  ........... H04L 1/1861
(Continued)

OTHER PUBLICATIONS

3GPP, "Technical Specification Group Radio Access Network; NR; Physical layer procedures for control (Release 15)," 3GPP TS 38.213 V15.5.0 (Mar. 2019), 104 pages.
(Continued)

*Primary Examiner* — Eric Nowlin
(74) *Attorney, Agent, or Firm* — Schwabe, Williamson & Wyatt, P.C.

(57) ABSTRACT

Methods, systems, and storage media are described for the prioritization of services for control and data transmission for new radio (NR) systems. In particular, some embodiments may be directed to the prioritization of hybrid automatic repeat request-acknowledgment (HARQ-ACK) transmissions. Other embodiments may be described and/or claimed.

17 Claims, 9 Drawing Sheets

(51) Int. Cl.
*H04W 72/04* (2009.01)
*H04L 5/00* (2006.01)

(56) References Cited

U.S. PATENT DOCUMENTS

| | | | |
|---|---|---|---|
| 11,172,495 B2* | 11/2021 | Hosseini | H04W 72/1242 |
| 2020/0077470 A1* | 3/2020 | Xiong | H04L 1/1854 |
| 2020/0228248 A1* | 7/2020 | Islam | H04L 5/0055 |
| 2020/0229211 A1* | 7/2020 | Hosseini | H04W 28/0205 |
| 2020/0313745 A1* | 10/2020 | Yang | H04B 7/0639 |
| 2020/0322120 A1* | 10/2020 | Yang | H04L 1/1664 |
| 2021/0099956 A1* | 4/2021 | Nam | H04W 52/0235 |
| 2021/0144688 A1* | 5/2021 | Lin | H04L 1/1861 |
| 2021/0227565 A1* | 7/2021 | Li | H04W 72/1284 |
| 2021/0250134 A1* | 8/2021 | Islam | H04W 72/0413 |

FOREIGN PATENT DOCUMENTS

| | | | | |
|---|---|---|---|---|
| WO | WO-2020167914 A1 * | 8/2020 | | H04L 1/1854 |
| WO | WO-2021089041 A1 * | 5/2021 | | H04W 72/042 |

OTHER PUBLICATIONS

Indian Patent Office—Office Action dated Nov. 11, 2021 from Indian Patent Application No. 202044013683, 6 pages.

* cited by examiner

100

```
┌─────────────────────────────────────────────────────────────────────┐
│ Receiving first UL resource information that includes an indication │
│ of a first UL resource in a serving cell of a first hybrid          │
│ automatic repeat request - acknowledgement (HARQ-ACK), the first    │
│ HARQ-ACK associated with a first HARQ codebook                      │
│                               105                                   │
└─────────────────────────────────────────────────────────────────────┘
                                  │
                                  ▼
┌─────────────────────────────────────────────────────────────────────┐
│ Receiving second UL resource information that includes an indication│
│ of a second UL resource in a serving cell of a second HARQ-ACK, the │
│ second HARQ-ACK associated with a second HARQ codebook              │
│                               110                                   │
└─────────────────────────────────────────────────────────────────────┘
                                  │
                                  ▼
┌─────────────────────────────────────────────────────────────────────┐
│ Storing the first UL resource information and second UL resource    │
│ information in a memory                                             │
│                               115                                   │
└─────────────────────────────────────────────────────────────────────┘
                                  │
                                  ▼
┌─────────────────────────────────────────────────────────────────────┐
│ Based on the first UL resource information and the second UL        │
│ resource information, performing the second HARQ-ACK transmission   │
│ using the second resource, and dropping the first HARQ-ACK          │
│ transmission                                                        │
│                               120                                   │
└─────────────────────────────────────────────────────────────────────┘
```

FIG. 1

200 

Receiving an indication of a first UL resource in a serving cell of a first hybrid automatic repeat request - acknowledgement (HARQ-ACK), the first HARQ-ACK associated with a first HARQ codebook
205

Receiving an indication of a second UL resource in a serving cell of a second HARQ-ACK, the second HARQ-ACK associated with a second HARQ codebook
210

Determining a first priority associated with the first HARQ-ACK codebook and a second priority associated with the second HARQ-ACK codebook, wherein the first priority is lower than the second priority
215

Based on the first priority being lower than the second priority, performing the second HARQ-ACK transmission using the second resource, and dropping the first HARQ-ACK transmission
220

Generating a first message that includes an indication of a first UL resource in a serving cell of a first hybrid automatic repeat request - acknowledgement (HARQ-ACK), the first HARQ-ACK associated with a first HARQ codebook
305

Encoding the first message for transmission to a user equipment (UE)
310

Generating a second message that includes an indication of a second UL resource in a serving cell of a second HARQ-ACK, the second HARQ-ACK associated with a second HARQ codebook
315

Encoding the second message for transmission to the UE
320

FIG. 3

PRIORITIZATION OF SERVICES FOR CONTROL AND DATA TRANSMISSION FOR NEW RADIO SYSTEMS

RELATED APPLICATIONS

This application claims priority to U.S. Provisional Patent Application No. 62/828,338 filed Apr. 2, 2019 and entitled "SYSTEM AND METHODS OF PRIORITIZATION OR MULTIPLEXING OF UL CONTROL AND UL CONTROL OR DATA TRANSMISSIONS FOR DIFFERENT SERVICES"; and to U.S. Provisional Patent Application No. 62/843,142 filed May 3, 2019 and entitled "SYSTEM AND METHODS OF PRIORITIZATION OR MULTIPLEXING OF UL CONTROL AND UL CONTROL OR DATA TRANSMISSIONS FOR DIFFERENT SERVICES," the entire disclosures of which are incorporated by reference in their entirety.

FIELD

Embodiments of the present disclosure relate generally to the technical field of wireless communications.

BACKGROUND

Among other things, embodiments of the present disclosure are directed to the prioritization of services for control and data transmission for new radio (NR) systems. In particular, some embodiments may be directed to the prioritization of hybrid automatic repeat request-acknowledgment (HARQ-ACK) transmissions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 4A:
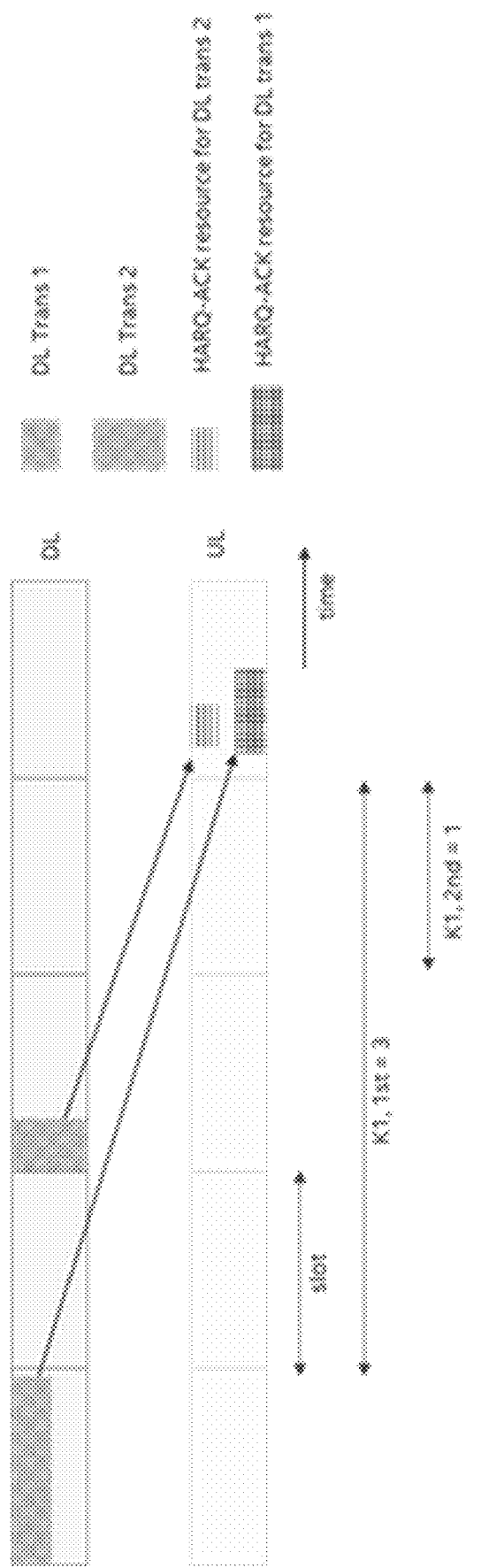
FIG. 4A illustrates an example of HARQ-ACK resource conflicts in an uplink (UL) slot.

Embodiments discussed herein may relate to the prioritization of services for control and data transmission for new radio (NR) systems. In particular, some embodiments may be directed to the prioritization of hybrid automatic repeat request-acknowledgment (HARQ-ACK) transmissions. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

The NR use case families, enhanced mobile broadband (eMBB) and ultra-reliable and low latency communications (URLLC) have very different requirements in terms of user plane latency and required coverage levels. The key requirements for URLLC relate to U-plane latency and reliability:

For URLLC the target for user plane latency should be 0.5 ms for UL, and 0.5 ms for DL.

The target for reliability should be 1×10-5 within 1 ms.

In NR, uplink control information (UCI) can be carried by physical uplink control channel (PUCCH) or physical uplink shared channel (PUSCH). In particular, UCI may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1—reference signal received power)).

As agreed in NR, when PUCCH resources carrying different UCI types overlap at least one symbol in time in a slot and if the UE is provided higher layer parameter simultaneousHARQ-ACK-CSI, UE would multiplex dynamic HARQ-ACK and/or SR and/or one or more CSI in a resource which is indicated by a PUCCH resource indication field in the DCI scheduling a PDSCH reception according to the payload size of the combined UCI.

However, when PUCCHs carrying UCIs with different reliability requirement overlap in a slot, it may not be desirable to multiplex UCIs into one PUCCH. For instance, it is expected that a large amount of resources would be allocated for UCI with very low, e.g. 10-5 Block Error Rate (BLER) target. If UCI with ultra-reliability requirement is multiplexed with UCI with 10-2 BLER target and transmitted in one physical channel, this large resource allocation may not be desirable for UCI with 10-2 BLER target due to spectrum efficiency loss. To address this issue, certain mechanisms may need to be defined to multiplex UCI with different reliability and latency requirements.

Among other things, embodiments of the present disclosure are directed to the prioritization of different services for control and data transmission. In particular, embodiments of the present disclosure may be directed to:

Prioritization of HARQ-ACK when more than one HARQ-ACK resources overlap;

Prioritization of HARQ-ACK when resources of more than one HARQ-ACK overlap with other UCI types;

Prioritization or dropping of UL data PUSCH when its resource overlaps different UCI types.

In the examples below, it is assumed that for multiplexing multiple UL control information (e.g., HARQ-ACK, SR, CSI) together, timeline requirements as defined in Section 9.2.5 in 3GPP TS 38.213 V15.5.0, "NR: Physical layer procedures for control," 2020 Jan. 14. are satisfied. Furthermore, a parameter or a UE behavior be configured implies the parameter or UE behavior is identified via higher layer signaling, such as UE specific RRC signaling. Furthermore, the HARQ-ACKs in the examples mentioned below may correspond to dynamically scheduled PDSCHs and/or semi-statically scheduled PDSCHs. Moreover, CSI report transmitted on an UL control channel, i.e., PUCCH, can be triggered periodically/semi-persistently or aperiodically.

Resource conflicts of multiple HARQ-ACKs of a UE

A NR UE may support different service types and transmission of different services may have different latency, rates, and/or reliability requirements. In one scenario, HARQ-ACK resources of multiple separate DL transmissions may overlap in time and/or frequency within a slot. Reliability or latency requirements of one HARQ-ACK transmission may be higher than the other HARQ-ACK(s). Hence, in some cases, UE may be required to transmit one HARQ-ACK transmission only and drop other overlapping HARQ-ACK transmissions without multiplexing. In FIG. 4A, resources of two HARQ-ACKs corresponding to two separate DL transmissions are shown to overlap in an UL slot. Although examples below are provided for overlapping resources of two HARQ-ACKs, similar principles can be extended to the cases when resources of more than two HARQ-ACKs overlap. For example, in the scenario of prioritizing a HARQ-ACK over the others in case their resources overlap, one or more examples of prioritization below can be applicable assuming a first HARQ-ACK is prioritized over a second HARQ-ACK group, i.e., second HARQ-ACK in the examples below can be replaced by second HARQ-ACK group which comprises the HARQ-ACKs that UE drops in order to prioritize and transmit the first HARQ-ACK.

In one embodiment, UE may be configured by higher layer signaling such as UE specific RRC signaling to prioritize and transmit the HARQ-ACK associated with the DL transmission that is scheduled with a DCI received with MCS-C-RNTI. MCS-C-RNTI is used by the gNB when DL and UL grant indicates MCS from a 64 QAM MCS table that has the lowest SE entry among the two 64 QAM MCS tables that can be configured for a UE. Alternatively, in one example, UE may be configured by higher layer signaling such as UE specific RRC signaling to prioritize and transmit the HARQ-ACK associated with the DL transmission that is scheduled with a DCI (received with C-RNTI) which indicates MCS from a configured 64 QAM MCS table that has lower SE points than legacy 64 QAM table. In these examples, using the 64 QAM MCS table with lowest SE points may be indicative of a scheduled transmission requiring high reliability. In one example, UE behavior may be specified that UE prioritizes the HARQ-ACK which is triggered by DCI masked with MCS-C-RNTI, transmits the HARQ-ACK and drops other HARQ-ACK with overlapping resource.

In one embodiment, UE may prioritize and transmit the HARQ-ACK corresponding to the most recent DL transmission among the DL transmissions for which the resources of HARQ-ACKs are in collision in a slot, that is, HARQ-ACK transmission for the PDSCH scheduled by the latest PDCCH is prioritized. In another example, UE may prioritize and transmit the HARQ-ACK for which the indicated K1 (PDCCH to HARQ timing indicator in DCI format 1_0 or 1_1) is smaller. In FIG. 4A, an example is shown where HARQ-ACK resource corresponding to first (second) DL transmission is 3 (1) slot(s) after the slot where the DCI for first (second) DL transmission is received. K1 can be in slot(s) or symbol(s) or a combination thereof.

In one embodiment, K>1 HARQ-ACK codebooks can be configured for a UE and UE may also be configured with priority level for a HARQ-ACK codebook group, where a HARQ-ACK codebook group may comprise one or more configured HARQ-ACK codebooks for the UE. For example, a first HARQ-ACK codebook group may be configured with lower priority level than a second HARQ-ACK codebook group.

In another variant of the embodiment, the HARQ-ACK CB (codebook) group is associated with a priority implicitly or based on specifications. For instance, the HARQ-ACK CB that supports multiple transmissions of PUCCH with HARQ-ACK in a slot is specified as one with higher priority. In this case, a HARQ-ACK CB (codebook) group may be comprised of one or more HARQ-ACK CBs such that all of the constituent CBs either support a single PUCCH transmission with HARQ-ACK within a slot or support multiple transmissions of PUCCH with HARQ-ACK. In one embodiment, if a first UL resource of HARQ-ACK corresponding to a first DL transmission, where the HARQ-ACK bits are mapped to a HARQ codebook belonging to a first HARQ codebook group, and a second UL resource of HARQ-ACK corresponding to a second DL transmission, where the HARQ-ACK bits are mapped to a HARQ codebook belonging to a second HARQ codebook group, overlaps in time and/or frequency, UE prioritizes and transmits the HARQ-ACK corresponding to the second DL transmission and drops the HARQ-ACK corresponding to the first DL transmission when first HARQ codebook group is configured with lower priority than second HARQ codebook group. In one example, if the DCI for first DL transmission is transmitted in slot n and the DCI for second DL transmission is transmitted in slot k, then n<k or n≥k may hold. In one example, last symbol of the PDCCH scheduling first transmission may be before the last symbol of the PDCCH scheduling second transmission. In another example, first DL transmission ends before the second DL transmission. In an example, if HARQ-ACKs' resources overlap in time and/or frequency in a slot or in a symbol group and HARQ-ACKs belong to different codebook, UE prioritizes and transmits the HARQ-ACK corresponding to the most recent DL transmission. In one example, UE may identify the HARQ codebook for mapping the HARQ-ACK bits corresponding to a DL transmission via explicit DCI indication or higher layer signaling or implicitly based other parameter indications in the DCI, such as indicated time/frequency resource, MCS, repetition number, number of MIMO layers, PDCCH to HARQ timing indicator, and/or NDI bit (i.e., new or retransmission). In one example, priority of the mapped HARQ codebook may be indicated in the DCI or implicitly obtained from the DCI parameters listed above.

In one embodiment, HARQ-ACK of a retransmission may be of higher priority and if there is overlap in resources of HARQ-ACKs corresponding to a new transmission of HARQ PID x and retransmission of HARQ PID y, x≠y, UE prioritizes and transmits HARQ-ACK corresponding to the re-transmission and drops the HARQ-ACK corresponding to the new transmission. In one example, if there is overlap in resources of HARQ-ACKs corresponding to ith retransmission of HARQ PID x and jth retransmission of HARQ PID y, x≠y, j>i=>1, UE prioritizes and transmits HARQ-ACK corresponding to the ith re-transmission and drops the HARQ-ACK corresponding to the jth re-transmission. In another example, if there is overlap in resources of HARQ-ACKs corresponding to ith retransmission of HARQ PID x and jth retransmission of HARQ PID y, x≠y, j>i=>1, UE prioritizes and transmits HARQ-ACK corresponding to the jth re-transmission and drops the HARQ-ACK corresponding to the ith re-transmission.

In one embodiment, if UL resources of two HARQ-ACKs overlap, UE prioritize and transmit the HARQ-ACK that has larger payload than the other HARQ-ACK. For example, one HARQ-ACK may comprise HARQ-ACK bits corresponding to DL transmissions over multiple carriers (CA case), and other HARQ-ACK may only contain HARQ-ACK bits of transmissions in a carrier. Dropping of HARQ-ACK feedback for CA case may cause system efficiency loss. Alternatively, in another example, if UL resources of two HARQ-ACKs overlap, UE prioritize and transmit the HARQ-ACK that has smaller payload than the other HARQ-ACK and/or the HARQ-ACK with smaller payload corresponds to a later DL transmission of the two transmissions. In another variant, the UE may be configured by higher layers to follow either of the two behaviors or one in which priority of HARQ-ACK transmission is not dependent on HARQ-ACK payload.

In one embodiment, if UL resources of two HARQ-ACKs overlap, UE prioritizes and transmits the HARQ-ACK corresponding to the latter DL transmission if the payload of resulting multiplexed payload or the code-rate exceeds a configured threshold.

Figure 4B:
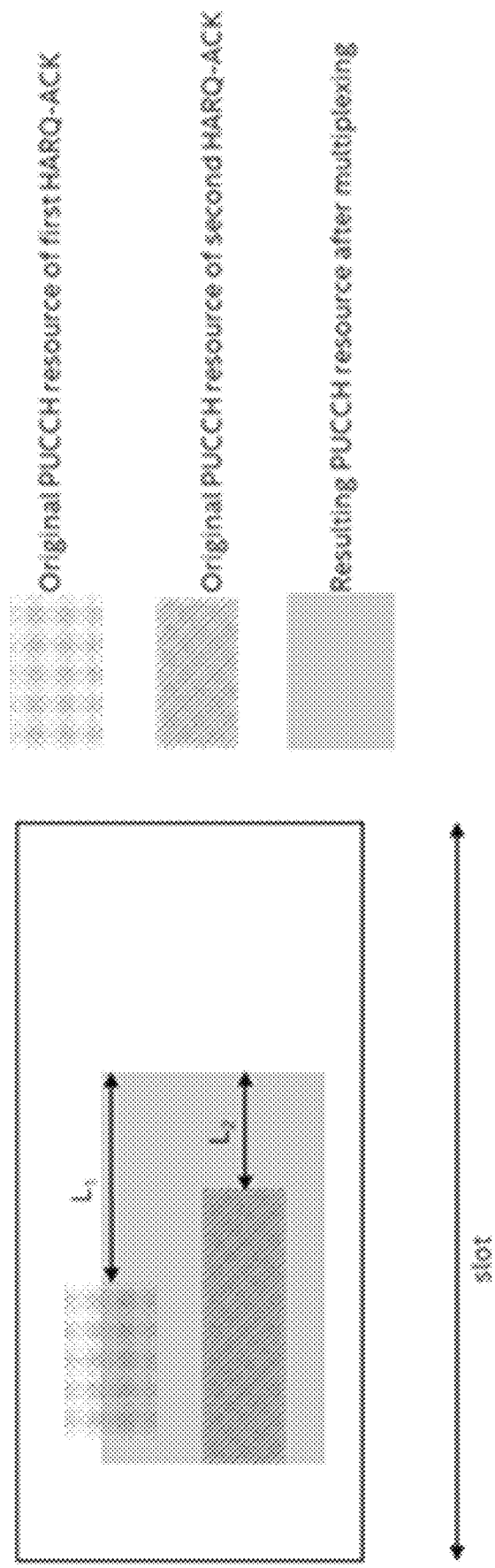
FIG. 4B illustrates an example of dropping a HARQ-ACK transmission in accordance with some embodiments.

In one embodiment, if UL resources of two HARQ-ACKs overlap, UE prioritizes and transmits the HARQ-ACK corresponding to the latter DL transmission if last symbol of the resulting PUCCH resource of the multiplexed HARQ-ACKs is located after L>0 symbols from the last symbol of the original PUCCH resource of the HARQ-ACK corresponding to the latter DL transmission. Value of L can be configured by higher layer for a given numerology. FIG. 4B illustrates an example where the last symbol of resulting PUCCH resource is L1 and L2 symbols after the last symbols of original PUCCH resource for first and second HARQ-ACK, respectively. As illustrated in FIG. 4B, in some embodiments where if L1 or L2 (depends on which HARQ-ACK corresponds to the latter DL transmission) exceeds a threshold, dropping of the HARQ-ACK corresponding to the earlier DL transmission may be necessary. If the last symbol of the resulting PUCCH resource is located much later in the slot than the last symbol of the original PUCCH resource, HARQ-ACK transmission may be delayed which may adversely affect low latency communications requiring prompt HARQ feedback.

In one embodiment, if the UE is not configured or indicated with any associated priority or cannot resolve the priority levels (or if indicated/configured with same priority level) of the two HARQ-ACKs for which the UL resources overlap, UE may follow R15 behavior for multiplexing the HARQ-ACKs (i.e., in terms of payload and/or timeline requirements) and/or dropping one of the HARQ-ACKs, cf. TS 38.213.

In one embodiment, in case of resource overlaps of the HARQ-ACKs, UE only multiplex them if they belong to same HARQ codebook and if timeline and/or payload requirements are met, otherwise (if mapped to different HARQ-ACK codebooks), UE transmits the HARQ-ACK corresponding to the last DL transmission.

In one embodiment, if no priority level is associated with a first and a second HARQ-ACK codebook and if resource of HARQ-ACK bits mapped to first codebook and second codebook overlaps, UE multiplexes the HARQ-ACKs corresponding to first and second codebook.

In a further embodiment, in case of time-domain overlaps between PUCCH occasions corresponding to two different HARQ-ACK CBs and when multiplexing of HARQ-ACK bits across different CBs is configured to the UE or is to be followed based on implicit rules (discussed above), the UE multiplexes the HARQ-ACK bits corresponding to both CBs and transmits using a PUCCH resource indicated by the latter of the two last DCIs corresponding to each HARQ-ACK CB. Alternatively, the final PUCCH resource to carry the multiplexed HARQ-ACK bits is the one indicated by one of the two HARQ-ACK CBs as configured by higher layers (that is, irrespective of the relative timing between the last DCIs for each HARQ-ACK CB). In another example, the last DCI and the PUCCH resource set associated with the HARQ-ACK CB corresponding to a single PUCCH transmission with HARQ-ACK feedback in a slot is prioritized in determining the resulting PUCCH resource to carry the multiplexed HARQ-ACK bits. In yet another example, the last DCI and the PUCCH resource set associated with the HARQ-ACK CB corresponding to a multiple PUCCH transmission with HARQ-ACK feedback in a slot is prioritized in determining the resulting PUCCH resource to carry the multiplexed HARQ-ACK bits.

In one embodiment, a PUCCH resource set or a PUCCH resource is configured by higher layers to be associated with a certain priority level. When more than one PUCCH resources with different priority levels carrying HARQ-ACK codebooks overlap in time in a slot within a PUCCH group, PUCCH resource with highest priority is transmitted and PUCCH resource with lowest priority is dropped. Further, when more than one PUCCH resources with same priority levels carrying HARQ-ACK codebooks overlap in time in a slot within a PUCCH group, UE follows Rel-15 behavior to multiplex HARQ-ACK codebooks on one PUCCH resource.

In one embodiment, a control resource set (CORESET) or a search space set may be configured by higher layers to be associated with a certain priority level. When HARQ-ACK codebooks scheduled by CORESETs or search space sets with different priority levels overlap in time in a slot within a PUCCH group, HARQ-ACK codebooks scheduled by CORESETs or search space sets with highest priority level are transmitted and others are dropped. Further, when HARQ-ACK codebooks scheduled by CORESETs or search space sets with same priority level overlap in time in a slot within a PUCCH group, UE follows Rel-15 behavior to multiplex HARQ-ACK codebooks on one PUCCH resource.

When DL SPS with sub-slot level granularity is supported for URLLC, certain enhancements need to be considered for HARQ-ACK codebook generation and PUCCH resource indication.

In one embodiment, SPS-Config or a PUCCH resource configured by n1PUCCH-AN within SPS-Config may be configured by higher layers to be associated with a certain priority level. This may indicate that SPS HARQ-ACK is associated with a certain priority level. When SPS HARQ-ACK carried by a PUCCH resource overlaps with one or more PUCCH resource carrying CSI/SR and/or HARQ-ACK which is dynamically triggered by a DCI in a PUCCH group in a slot, where SPS HARQ-ACK may be associated with higher priority, UE may transmit SPS HARQ-ACK and drop other UCI types and vice versa.

In one embodiment, when more than one SPS HARQ-ACK feedbacks overlap with HARQ-ACK which is dynamically triggered by a DCI for scheduling PDSCH, and if these HARQ-ACK feedbacks are associated with same priority or if these HARQ-ACK are not configured or implicitly implied to be associated with priority level, UE multiplexes all HARQ-ACKs in a PUCCH, where the PUCCH resource is determined by the PUCCH resource indicator (PRI) carried in the scheduling DCI for the dynamically scheduled PDSCH from the selected PUCCH resource set, which is determined in accordance with the combined payload size. Note that the bits in the combined HARQ-ACK codebook can be ordered as: first SPS HARQ-ACK bits, followed by HARQ-ACK bits corresponding to PDSCH which is dynamically triggered, where SPS HARQ-ACK can be ordered based on the timing of DL SPS PDSCH transmission and/or PUCCH resource.

In one embodiment, when more than one SPS HARQ-ACK feedbacks overlap with CSI report/SR, and if SPS HARQ-ACK and CSI report/SR are associated with same priority, UE may multiplex SPS HARQ-ACK and CSI report/SR in a single PUCCH resource, where the PUCCH resource is selected from multi-CSI-PUCCH-ResourceList and determined based on the combined payload size. The SPS HARQ-ACK codebook can be determined as mentioned above.

In one example, if sub-slot level DL SPS (i.e., multiple SPS occasions in a slot) is configured for a UE, and if more than 1 SPS HARQ-ACK overlap with SR, the HARQ-ACK+SR is transmitted in a PUCCH resource based on the earlier SPS occasion in the slot. In another example, SR is just dropped and not transmitted.

Resource Conflicts of One or More HARQ-ACKs and CSI Report

In a given duration (e.g., in a slot or within a group of contiguous symbols), resources of multiple HARQ-ACKs of a UE may overlap in time and/or frequency with PUCCH resource of CSI report. In one embodiment, UE multiplexes the HARQ-ACKs with the CSI report into one resulting PUCCH resource if the timeline and/or payload requirement is satisfied, e.g., following R15 behavior, cf. TS 38.213.

In one embodiment, a PUCCH resource within multi-CSI-PUCCH-ResourceList or multi-CSI-PUCCH-ResourceList may be configured by higher layers to be associated with a certain priority level. In this case, CSI report carried by PUCCH is associated with a priority level.

Note that when more than one CSI reports overlap in a slot, one CSI report carried by a PUCCH resource with highest priority is transmitted and other CSI reports carried by PUCCH resources with lower priority are dropped.

In one embodiment, if UE is configured to prioritize to transmit one HARQ-ACK in case resources of more than one HARQ-ACK feedback bits overlap and if PUCCH resource of CSI report overlaps with the resource of the prioritized HARQ-ACK, UE multiplexes the CSI report with the prioritized HARQ-ACK and transmits in a resultant new PUCCH resource. Prioritization indication by the UE to identify which HARQ-ACK to transmit can be obtained according to the examples mentioned above under "resource conflicts of multiple HARQ-ACKs". In one example, UE multiplexes CSI report with the HARQ-ACK corresponding to the most recent DL transmission, among the K>1 DL transmissions for which the resources of HARQ-ACKs overlap, and drop HARQ-ACKs associated other K−1 DL transmissions.

In one embodiment, if UE is configured to prioritize to transmit one HARQ-ACK in case resources of more than one HARQ-ACK feedback bits overlap and if PUCCH resource of CSI report overlaps with the resource of the prioritized HARQ-ACK, UE transmits the prioritized HARQ-ACK and drops the CSI report and other HARQ-ACKs. Moreover, in the context of this example, if UE is configured to prioritize to transmit one HARQ-ACK in case resources of more than one HARQ-ACKs overlap and if PUCCH resource of CSI report does not overlap with the resulting PUCCH resource of the prioritized HARQ-ACK, UE transmits the prioritized HARQ-ACK and the CSI report in non-overlapping PUCCH resources and drop other HARQ-ACKs.

In one embodiment, if UE is configured to prioritize to transmit one HARQ-ACK in case resources of more than one HARQ-ACK feedback bits overlap and if PUCCH resource of CSI report overlaps with the resource of the prioritized HARQ-ACK, UE transmits the prioritized HARQ-ACK and drops other HARQ-ACKs and multiplexes the CSI report with the prioritized HARQ-ACK if certain conditions are met such as payload of CSI report or combined payload or code rate is below a configured threshold. This may facilitate protecting the reliability of the prioritized HARQ-ACK transmission when it is multiplexed with CSI report.

In one embodiment, if the resources of at least one HARQ-ACK overlaps with resource of CSI report where the CSI report is based on the CQI table associated with a configured BLER target such as $10^{-5}$, UE prioritizes and transmits the CSI report and drops the HARQ-ACK. In another example, if the resources of a first HARQ-ACK overlaps with resource of CSI report where the CSI report is based on the CQI table associated with a configured BLER target such as $10^{-5}$, UE multiplexes the CSI report with the first HARQ-ACK, with or without any priority level associated with the first HARQ-ACK.

Resource Conflicts of One or More HARQ-ACKs and/or SR and/or CSI Report

NR supports configuration of multiple scheduling requests from a single device. A logical channel can be mapped to zero or more scheduling request configurations. This provides the gNB not only with information that there are data awaiting transmission in the device, but also what type of data are awaiting transmission. This is useful information for the gNB given the wider range of traffic types the NR is designed to handle. For example, the gNB may want to schedule a device for transmission of latency-critical information but not for non-latency-critical information.

In one embodiment, a UE is configured with a first and a second SR configurations where first SR configuration has a higher priority than second SR configuration, and if resources of one or more HARQ-ACKs overlap with the resource of a positive SR transmit occasion according to first SR configuration, UE prioritizes the SR transmission and drops the HARQ-ACK(s) (i.e., a certain SR configuration may not allow multiplexing with HARQ-ACKs). Furthermore, if resources of one or more HARQ-ACKs overlap with the resource of a positive SR transmit occasion according to second SR configuration, UE either multiplexes the SR with the HARQ-ACKs or transmits one or more HARQ-ACKs and drops the SR. UE may attempt to transmit the dropped SR at next opportunity according to the configuration. In one example, if resources of one or more HARQ-ACKs overlap with the resource of a positive SR transmit occasion according to first SR configuration, UE multiplexes the SR with one or more HARQ-ACKs if the last symbol of the resultant PUCCH resource is not located after K symbols of the last symbol of the original SR transmit occasion, otherwise UE prioritizes and transmits SR and drops the one or more HARQ-ACKs. K can be configured by higher layer, e.g., as part of SR configuration.

In one embodiment, a higher layer parameter e.g., simultaneousSR-CSI may be configured as part of the SR and/or CSI report configurations, which if present, indicates that SR and CSI report can be multiplexed. Alternatively, in one example, a UE is configured with a first and a second SR configurations where first SR configuration has a higher priority than second SR configuration or second SR configuration includes simultaneousSR-CSI whereas first SR configuration does not, and a first and a second CSI report configurations where first CSI report configuration has a higher priority than second CSI report configuration or second CSI report configuration includes simultaneousSR-CSI whereas first CSI report configuration does not, and if resources of SR and CSI report overlaps, one or more of the following behaviors can be configured for the UE:

- If transmit occasion of a SR, e.g., positive SR, based on first SR configuration overlaps with resource of CSI report based on first CSI report configuration, UE prioritizes and transmits SR, and drops CSI report, i.e., if none of the colliding SR and CSI report support simultaneousSR-CSI, UE can be configured to prioritize SR over CSI report.
- If transmit occasion of a SR, e.g., positive SR, based on first SR configuration overlaps with resource of CSI report based on second CSI report configuration, UE prioritizes and transmits SR, and drops CSI report, i.e., although CSI report support simultaneousSR-CSI, SR configuration does not support and UE can be configured to prioritize SR over CSI report.
- If transmit occasion of a SR, e.g., positive SR, based on second SR configuration overlaps with resource of CSI report based on second CSI report configuration, UE multiplexes SR and CSI report into a PUCCH resource, e.g., based on PUCCH format that UE would use for transmission of CSI report.

In one embodiment, if resources of SR and CSI report overlaps, UE may multiplex SR with CSI report if last symbol of the PUCCH carrying the combined UCI is not located after K≥1 symbols after the last symbol of original PUCCH resource of SR transmit occasion. K can be configured by higher layer, e.g., as part of SR configuration, such as how much a positive SR can be delayed if multiplexed with other UCI.

In one embodiment, within a given duration (e.g., in a slot or a group of contiguous symbols), if resources of a first HARQ-ACK and/or a second HARQ-ACK, a CSI report associated with a first CSI report configuration (in 3GPP spec, referred to as CSI-ReportConfig), and an SR associated with a first SR configuration overlaps, following UE behaviors/procedures/configurations can be identified:

- If UE is configured with simultaneousHARQ-ACK-CSI, UE multiplexes both HARQ-ACKs, with or without multiplexing SR, and CSI onto a single PUCCH resource, e.g., up to a maximum combined UCI payload, which if exceeds, UE may drop part of or full CSI report
  - If UE is not configured with simultaneousHARQ-ACK-CSI, UE either multiplexes both HARQ-ACKs with or without multiplexing SR, or prioritizes and transmits one HARQ-ACK with or without multiplexing SR and drops the other HARQ-ACK, and drops CSI report
- First HARQ codebook is configured with simultaneousHARQ-ACK-CSI whereas second HARQ codebook is not, which may imply:
  - If resources of SR and CSI report overlaps with resource of first HARQ-ACK associated with first codebook, UE multiplexes HARQ-ACKs, with/without multiplexing SR, and CSI onto a single PUCCH resource
  - If resources of SR and CSI report overlaps with resource of second HARQ-ACK associated with second codebook, UE prioritizes and transmits second HARQ-ACK with/without multiplexing SR, and drops CSI report If resources of SR and CSI report overlaps with resources of first HARQ-ACK and second HARQ-ACKs associated with first codebook and second codebook respectively, UE either multiplexes both HARQ-ACKs and CSI with or without multiplexing SR, or prioritizes and transmits second HARQ-ACK with or without multiplexing SR and drops the first HARQ-ACK, and drops CSI report. Accordingly, the resulting PUCCH resource may be determined based at least in part on the PUCCH resource sets and PRI associated with the first or the second HARQ-ACK CB respectively.

If resources of SR and CSI report overlaps with resource of first HARQ-ACK associated with first codebook, UE multiplexes HARQ-ACKs, SR, and CSI onto a single PUCCH resource, if the last symbol of the resultant PUCCH resource carrying the combined UCI payload is not located after $K1 \geq 1$ and/or $K2 \geq 1$ symbols of the last symbols of the original PUCCH resource carrying HARQ-ACK and SR, respectively, otherwise, UE transmits the HARQ-ACK with/without multiplexing SR and drops CSI. In one example, K1 and K2 can be higher layer configured, and can be included in codebook and SR configuration separately.

In one example, resources of SR and CSI report overlaps with resources of first HARQ-ACK associated with first codebook and resources of second HARQ-ACK associated with second codebook, however second HARQ-ACK is not latency critical and its associated codebook may not configured with any K value as mentioned in previous example. Hence, if UE chooses to multiplex both HARQ-ACKs, conditions in above bullet may still apply (regarding K1, K2), and if not satisfied, UE transmits the multiplexed HARQ-ACKs or the prioritized HARQ-ACK with/without multiplexing SR and drops CSI.

In one embodiment, in case when one or more CSI report, one or more HARQ-ACK codebooks, or one or more SR with same or different priority levels overlap in a slot, UE may first drop the one or more CSI/HARQ-ACK/SR with lower priorities when overlapping, and subsequently multiplex the CSI/HARQ-ACK/SR with highest priority when overlapping in accordance with the multiplexing rule as defined in Rel-15.

In one embodiment, in case when one or more CSI report, one or more HARQ-ACK codebooks, or one or more SR with same or different priority levels overlap in a slot, UE may first multiplex the CSI/HARQ-ACK/SR with same priority when overlapping in accordance with the multiplexing rule as defined in Rel-15. Subsequently UE drops one or more CSI/HARQ-ACK/SR with lower priority and transmits CSI/SR/HARQ-ACK (if any) with highest priority.

Note that the above two embodiments can also be applicable for the case when one or more PUSCHs and one or more PUCCHs with same or different priority levels overlap in a slot within a PUCCH group.

Resource Conflicts of UL Data and UL Control

In the following embodiments/examples, PUSCH can be dynamic grant-based or configured-grant based, unless otherwise mentioned. In the examples, where PUSCH is dropped and one or more UCI types can be multiplexed or one UCI type may be prioritized over one or more other UCI types if their resources overlap, examples of prioritization and multiplexing mentioned above apply here too. For multiplexing or dropping to take place, following examples assume necessary requirements regarding timeline is satisfied. Refer to TS 38.213 for considerations on timeline requirements for UCI multiplexing.

In one embodiment, if a PUCCH transmission that includes a positive SR overlaps with a PUSCH without UL-SCH on a serving cell, e.g., contains only A-CSI report, where the PUSCH duration is no more than $K \geq 1$ symbols, e.g., K=1, 2, 3, 4, 5, 6, 7 symbols for a given numerology, UE transmits the PUSCH and drops/delays the SR. K can be configured by higher layer.

In one example, SR can be multiplexed/piggybacked on to the PUSCH without UL-SCH. The PUSCH may also carry aperiodic CSI report.

In one embodiment, if resource of a first PUSCH or a PUSCH repetition overlaps with resources of a first HARQ-ACK and a second HARQ-ACK and/or resources of first and/or second SR and/or resource of a first CSI report in a slot or in a contiguous group of symbols, where:

If resources of first and second HARQ-ACK overlaps
  if first HARQ-ACK is prioritized over second HARQ-ACK
    UE may transmit the first HARQ-ACK, and drop the PUSCH and second HARQ-ACK
      HARQ-ACK transmission can be multiplexed with SR and/or CSI report or prioritized over SR and/or CSI report
    UE may multiplex the first HARQ-ACK onto PUSCH according to the indicated or configured beta offset values and drops second HARQ-ACK
      One or more overlapping SR is dropped, CSI report can be multiplexed onto PUSCH along with first HARQ-ACK
  UE may multiplex both HARQ-ACKs, along with CSI report, onto PUSCH according to the beta-offset configured or indicated
    If first HARQ-ACK is associated with first HARQ codebook and second HARQ-ACK associated with a second codebook, UE may be configured with same or separate beta offsets associated with the codebooks.
    One or more overlapping SR is dropped
  if resources of first and second HARQ-ACK does not overlap
    UE may multiplex the first HARQ-ACK onto PUSCH according to the indicated or configured beta offset values and drops second HARQ-ACK
      One or more overlapping SR is dropped, CSI report can be multiplexed onto PUSCH along with first HARQ-ACK
    UE may transmit the first HARQ-ACK and second HARQ-ACK, and drop PUSCH
      HARQ codebook configuration or at least one of the DCIs that scheduled the PDSCHs corresponding to the first and second HARQ-ACK may include indication of prioritization so that other overlapping transmission with the HARQ-ACK is dropped.
      SR and/or CSI report may or may not be multiplexed with overlapping HARQ-ACK
    UE may multiplex both HARQ-ACKs onto PUSCH according to the beta-offset configured or indicated
      If first HARQ-ACK is associated with first HARQ codebook and second HARQ-ACK associated with a second codebook, UE may be configured with same or separate beta offsets associated with the codebooks.

CSI report can be multiplexed along with HARQ-ACK onto PUSCH

SR is dropped

If PUSCH resource configuration or DCI that scheduled the PUSCH includes an indication of prioritization of PUSCH UE drops overlapping SR(s), regardless of SR configuration, and multiplexes HARQ-ACK(s) and/or CSI report onto PUSCH according to configured or indicated beta offset UE drops the PUSCH and transmits the SRs, assuming resources of SR transmit occasion does not overlap and SR configuration of at least one SR prioritizes SR transmission over PUSCH UE may multiplex first or second SR with HARQ-ACKs and/or CSI report, if SR configuration allows and/or resultant PUCCH resource does not end beyond a certain duration after the original SR transmit location, cf. examples mentioned above regarding handling conflicts of SR and other UCIs.

In Rel-15, a UE does not expect to receive a PDSCH that is scheduled after reception of an UL grant scheduling a PUSCH such that the HARQ-ACK for the PDSCH is to be multiplexed with the PUSCH. However, in one embodiment, when configured with slot-based or enhanced PUSCH repetitions, the UE may receive a PDSCH subsequent to reception of an UL grant triggering PUSCH transmissions with repetitions. In such a case, the UE may be expected to multiplex the HARQ-ACK (and any other UCI as permitted by multiplexing rules and time-line conditions) on a PUSCH repetition that overlaps with the PUCCH resource for HARQ-ACK feedback that follows the first repetition in the sequence of repetitions for the scheduled PUSCH.

In one embodiment, a first PUSCH/PUSCH repetition(s) and a second PUSCH/PUSCH repetition(s) overlaps, UE may be configured to prioritize and transmit first PUSCH/PUSCH repetitions over second PUSCH/PSUCH repetitions UE may drop overlapping portion or repetitions of second PUSCH/PUSCH repetition(s)

UE may drop or transmit the remaining portion or remaining repetitions of second PUSCH/PUSCH repetition(s)

After resolving which PUSCH to transmit in the overlapping duration, UE either prioritize and transmit the selected PUSCH dropping one or more overlapping UCI types or one or more overlapping UCI types (HARQ-ACK/CSI) can be multiplexed on to the selected PUSCH, except for SR which is dropped if there is a transmit occasion that overlaps with selected PUSCH.

In one embodiment, a first PUSCH/PUSCH repetitions overlaps with first SR based on first SR configuration and a second PUSCH/PUSCH repetitions, If the given SR configuration is prioritized, First SR does not overlap with second PUSCH SR and second PUSCH are transmitted. First PUSCH is dropped, regardless of whether first PUSCH is prioritized over second PUSCH or not First SR overlaps with second PUSCH SR is transmitted and both PUSCHs are dropped If first PUSCH is prioritized over SR UE drops SR and overlapping portion or repetitions of second PUSCH/PUSCH repetitions, assuming first PUSCH/PUSCH repetitions are prioritized In one embodiment, a first PUSCH/PUSCH repetitions overlaps with resource of a first UCI and a second PUSCH/PUSCH repetitions, where second PUSCH/PUSCH repetitions end after first PUSCH/PUSCH repetitions If second PUSCH/PUSCH repetitions is prioritized over first PUSCH/PUSCH repetitions and transmitted, UE drops the overlapping portion or repetitions of first PUSCH/PUSCH repetitions and multiplexes UCI onto second PUSCH/PUSCH repetitions Alternatively, UE may multiplex UCI onto one of the remaining repetitions of first PUSCH/PUSCH repetitions that does not overlap with second PUSCH/PUSCH repetitions In one embodiment, if resource of a UCI (HARQ-ACK/CSI) overlaps with resources of a first PUSCH/PUSCH repetitions and a second PUSCH/PUSCH repetitions, where second PUSCH/PUSCH repetitions end after first PUSCH/PUSCH repetitions UE may multiplex UCI onto the first PUSCH/PUSCH repetitions, i.e., whichever PUSCH ends early This is assuming two PUSCHs do not overlap If UCI is prioritized and not to be multiplexed with PUSCH The overlapping portions of the first and second PUSCHs are punctured In one embodiment, a positive SR arrives at the UE and based on LCH/LCP procedure at the UE, a first resource based on a first SR configuration is chosen to transmit the SR. Moreover, UE has data bits to be transmitted, either based on dynamic or configured grant, and the SR arrives, e.g., x=>1 symbols (based on a given numerology of the PUSCH) or x>0 micro-seconds, before the UE completes MAC PDU development for the data bits, with or without multiplexing other UCI such as HARQ-ACK and/or CSI. The PUSCH is mapped to a second resource with overlaps with first resource. In one example, if SR has a higher priority than PUSCH, which can be decided based on LCH priority, SR can be transmitted by dropping the PUSCH. However, this may result in throughput loss if the PUSCH is long. In one example, UE may be configured to multiplex SR onto PUSCH, if the SR arrives before UE builds the MAC PDU. UE can be configured with such multiplexing behavior (e.g., with UE specific RRC signaling), if a given SR configuration is used and/or may have a higher priority than other SR configuration or SR is identified to be at a higher priority level than PUSCH based on LCH/LCP at MAC. In another example, UE only considers multiplexing SR onto PUSCH, if SR transmit occasion overlaps with PUSCH, regardless of which SR configuration is used. SR can be multiplexed onto PUSCH, with or without including other UCI types such as HARQ-ACK and/or CSI report, in one or more of the following ways:

SR is transmitted using part of the PUSCH resources

The number of SR bits may depend on the number of states where SR configurations overlap with PUSCH. In particular, assuming K SR configurations overlap with PUSCH, the number of bits for SR on PUSCH can be determined as $\lceil \log_2(K+1) \rceil$ At least for ≤2 bit HARQ-ACK and SR, HARQ-ACK may be jointly encoded and HARQ-ACK and/or SR bits may be transmitted by puncturing the CSI part 2 or UL-SCH of the PUSCH.

For >2 bit HARQ-ACK and SR, HARQ-ACK may be jointly encoded and other UCI and UL-SCH are rate-matched around HARQ-ACK+SR For the cases, wherein rate-matching-based multiplexing is applied, the UE can be configured with one or more beta offset values for multiplexing SR onto PUSCH. A certain beta offset value from a set of configured beta offset values can be indicated by higher layer signaling or in the DCI scheduling the PUSCH.

In one example, if transmit occasion of SR of a first SR configuration overlaps with PUSCH and UE is configured by higher layer to multiplex SR onto PUSCH, UE may always reserve a certain number of REs within the mapped resource for PUSCH based on configured/indicated beta offset value, i.e., regardless of positive SR exists at the overlapping SR transmit occasion based on first SR configuration. UE multiplexes SR onto those REs if SR exists, otherwise those REs may be empty and no data bits are transmitted onto those REs.

In another example, if transmit occasion of SR of a first SR configuration overlaps with PUSCH and UE is configured by higher layer to multiplex SR onto PUSCH, UE may only multiplex SR onto PUSCH based on configured/indicated beta offset value if positive SR exists. If positive SR does not exist, UE instead uses all the REs of indicated PUSCH resource for data transmission. In this case, gNB would have to blindly decode whether SR is transmitted or not by the UE.

UE can be configured by higher layer signaling (e.g., UE specific RRC signaling) with a set of DMRS pattern and a DMRS pattern from the configured set can be used with PUSCH to indicate that PUSCH is carrying SR. To identify the priority or configuration of SR, a certain DMRS pattern can be used. For example, if SR is mapped to first SR configuration, then a first DMRS pattern is used, whereas if SR is mapped to second SR configuration, a second DMRS pattern may be used.

In another embodiment, buffer status report (BSR) can be multiplexed/appended to data bits in a PUSCH, where BSR may also include priority information. This may aid the gNB to identify that UE has urgent data bits waiting in the buffer and gNB could send an UL grant with appropriate resource allocation promptly.

In yet another embodiment, a positive SR arrives at the UE and based on LCH/LCP procedure at the UE, a first resource based on a first SR configuration is chosen to transmit the SR. Moreover, UE has data bits to be transmitted, either based on dynamic or configured grant, and the SR arrives, e.g., before or within x≥1 symbols based on a given numerology or x>0 micro-seconds, before the UE completes MAC PDU development for the data bits or after the UE completes MAC PDU development for the data bits. The PUSCH is mapped to a second resource with overlaps with first resource. In one example, UE can drop the SR and transmit the PUSCH as MAC PDU is already built. However, this may delay SR transmission and increases latency which may not be desirable for transmission for a given service. In one example, in this case, UE may be configured to transmit SR in the first resource or any other resource during the resource of PUSCH if the SR is based on a first configuration and UE may drop the SR if the SR is based on a second configuration (e.g., first configuration may be of higher priority than second configuration). UE may transmit SR during the PUSCH transmission in one or more of the following ways:

SR is transmitted using part of the PUSCH resources
The number of SR bits may depend on the number of states where SR configurations overlap with PUSCH.

At least for ≤2 bit HARQ-ACK and SR, HARQ-ACK and/or SR bits may be transmitted by puncturing the CSI part 2 or UL-SCH of the PUSCH.

For >2 bit HARQ-ACK and SR, other UCI are rate-matched around HARQ-ACK+SR

SR is transmitted in the first resource (e.g., first PUCCH resource) and PUSCH is punctured at the symbols of first PUCCH resource.

At the PUCCH resource symbols, PUSCH may be punctured fully or partially
In one example, PUSCH is punctured for the portion of PUSCH frequency allocation or RBs where SR PUCCH resource overlaps
In another example, PUSCH is punctured over the full PUSCH frequency allocation or RBs at the SR PUCCH resource symbols
In another example, due to potential mismatch of transmit power for PUSCH and PUCCH, UE may skip one or more symbols of PUSCH before the PUCCH resource in order to prepare for appropriate transmit power setup for PUCCH.
In one example, UE may be only configured for puncturing PUSCH for SR, if SR resource comprises less than K=>1 symbols. In one example, K is 1.
In one example, UE may be configured for puncturing PUSCH for SR, if PUSCH resource is longer than M=>1 symbols. In one example, M can be 7 or 14, based on a given numerology.

In another embodiment, the multiplexing based on transmit-side puncturing of the PUSCH REs (when the SR is transmitted using part of the PUSCH resources) or symbols (when the SR is transmitted on PUCCH resources) may be followed by the UE irrespective of whether the SR is generated in the UE before or after MAC PDU for the concerned PUSCH is generated. Alternatively, the multiplexing based on rate-matching of PUSCH around HARQ-ACK and/or SR REs may be defined irrespective of whether the SR is generated in the UE before or after MAC PDU generation. In this case, certain REs corresponding at least to a specified or configured number of SR bits are reserved and the PUSCH is rate-matched around these REs irrespective of actual SR transmission.

Further, for the above examples, the SR may only be multiplexed if the PUSCH satisfies certain specified or configured conditions that may include but not limited to: the LCH priority of the PUSCH compared to that for the SR configuration, the duration of the PUSCH, the SCS for the PUSCH, the type of PUSCH (configured grant PUSCH or dynamically granted PUSCH), etc.

Figure 5:
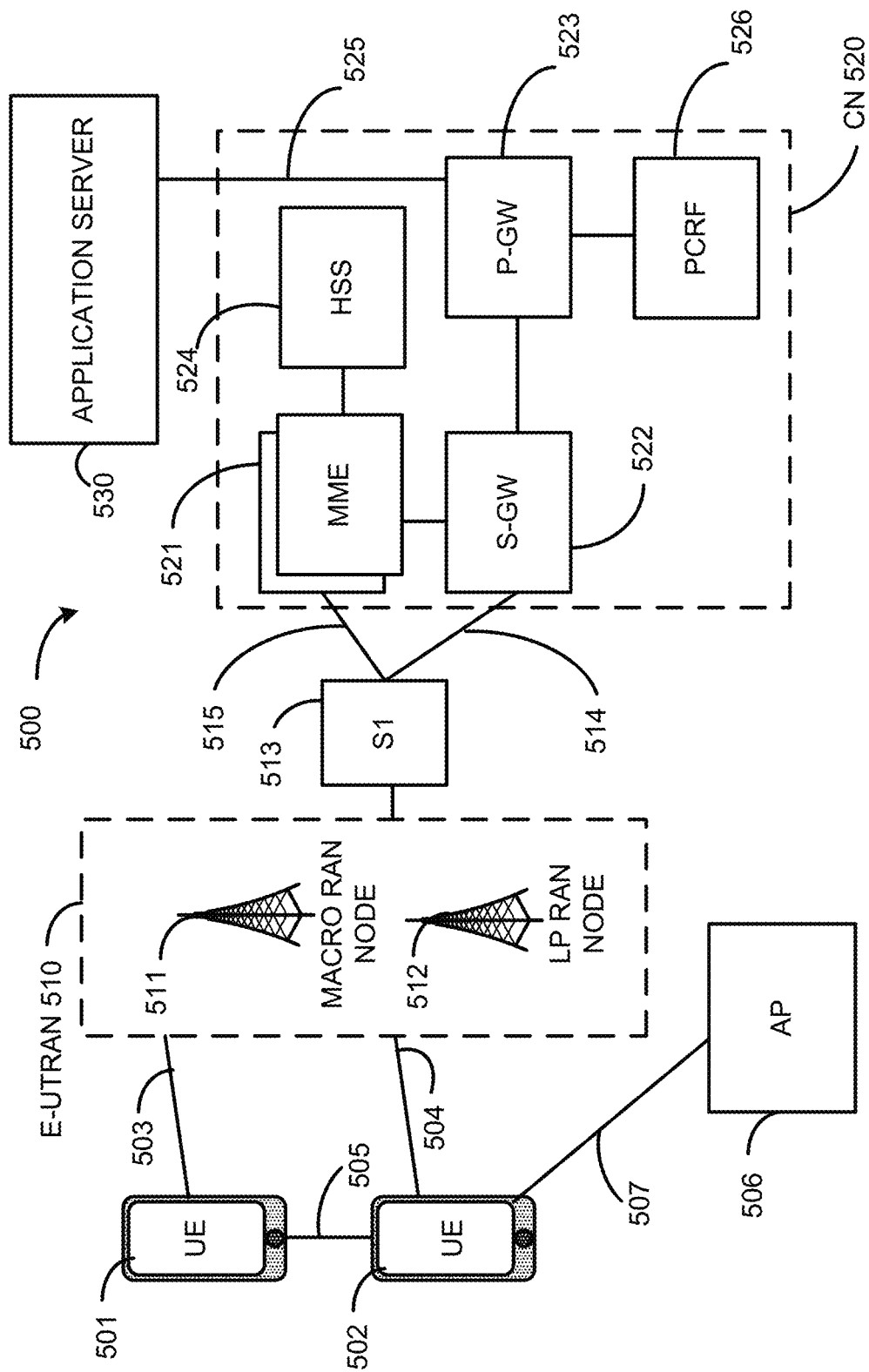
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMES 521.

In this embodiment, the CN 520 comprises the MMES 521, the S-GW 522, the Packet Data Network (PDN) Gateway (P-GW) 523, and a home subscriber server (HSS) 524. The MMES 521 may be similar in function to the control plane of legacy Serving General Packet Radio Service (GPRS) Support Nodes (SGSN). The MMES 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
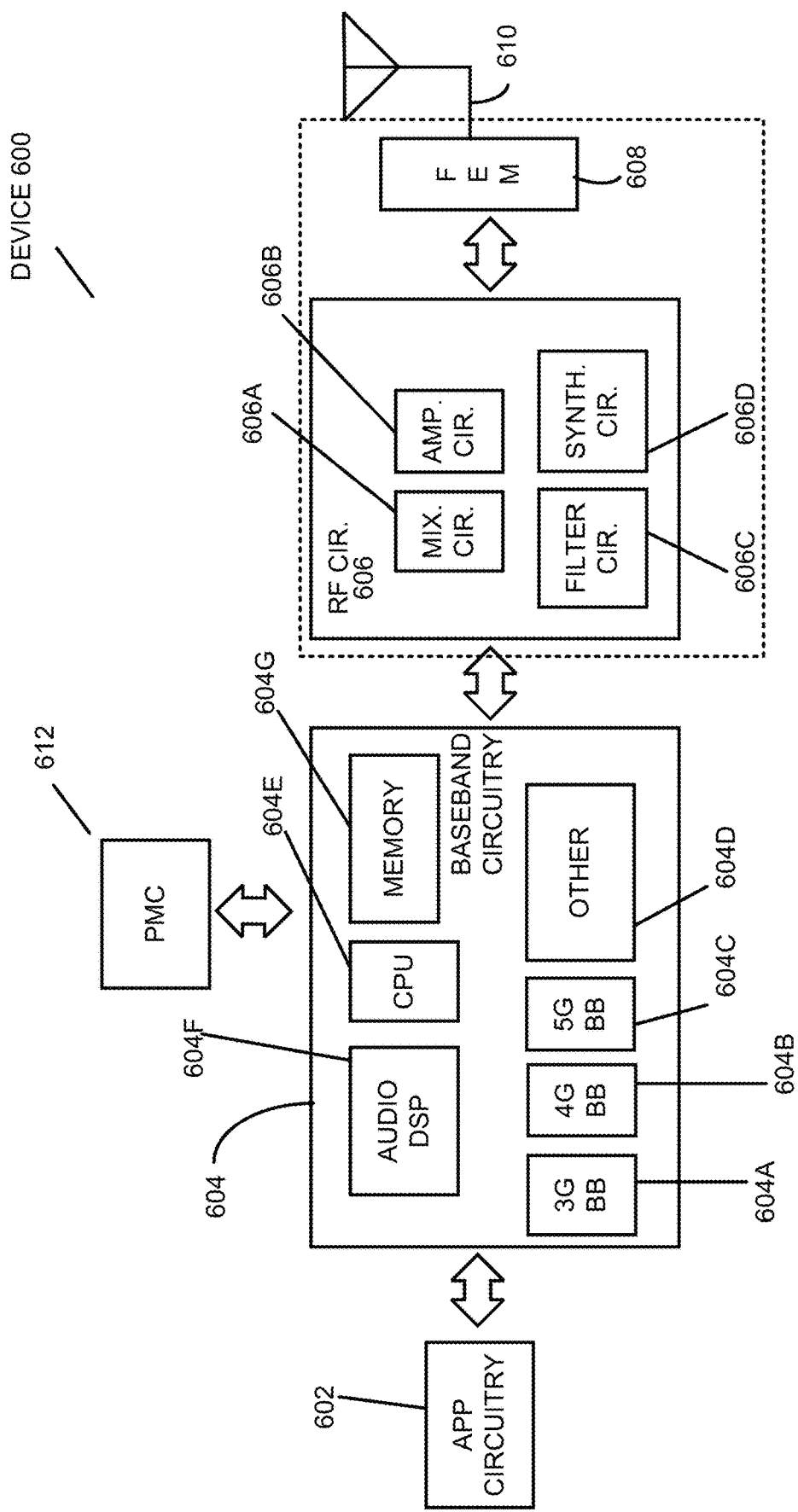
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
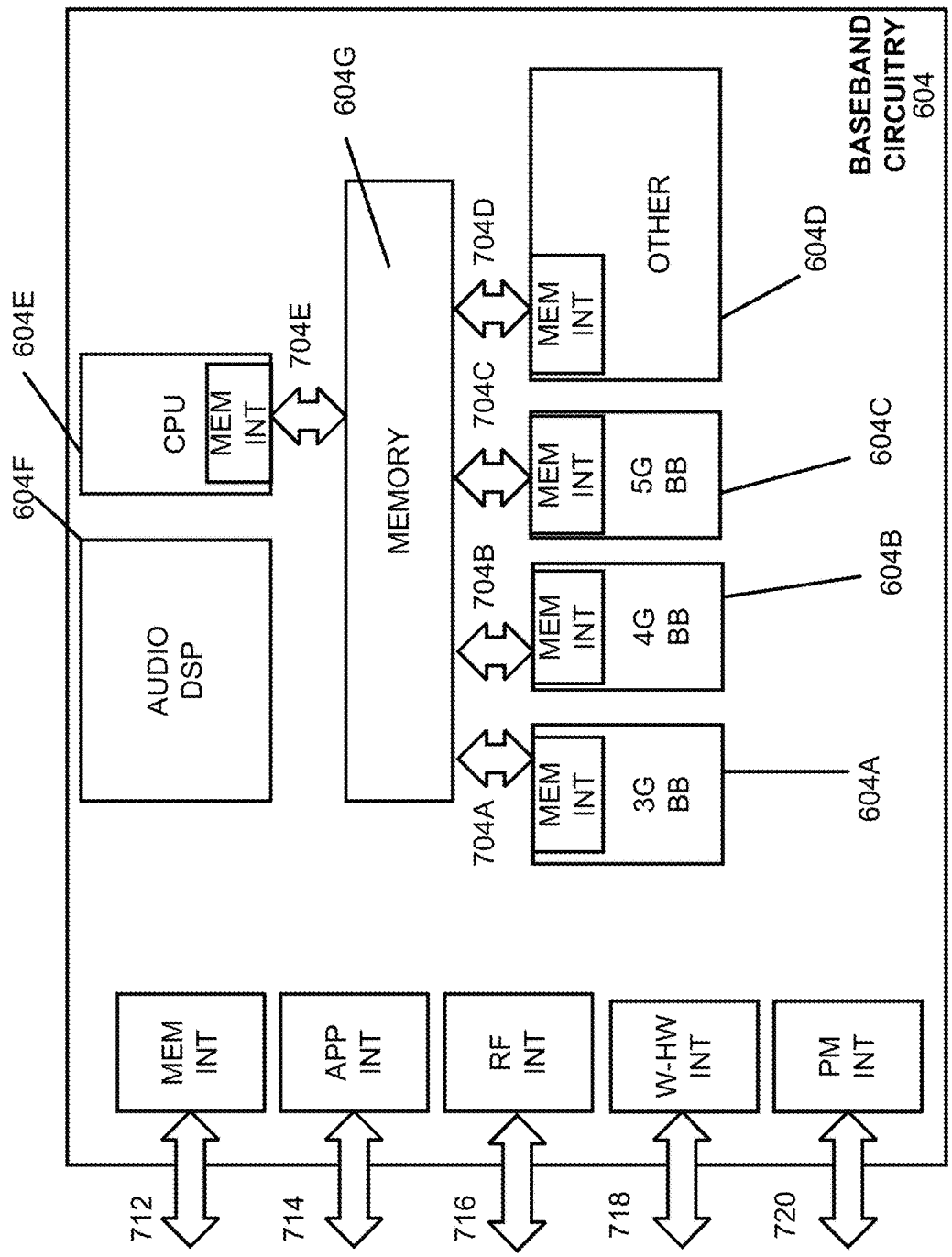
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
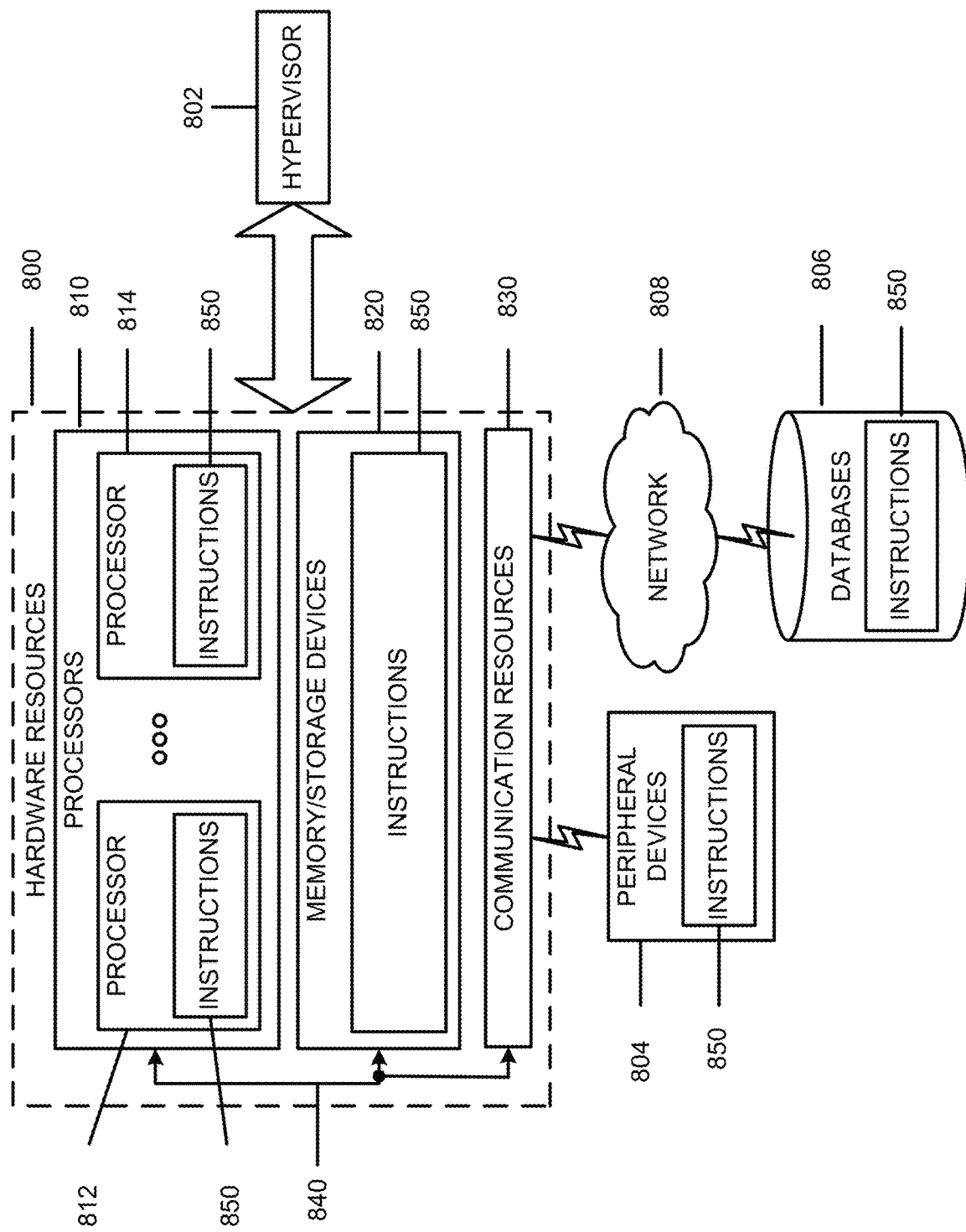
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components, Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a user equipment (UE) in accordance with some embodiments. In this example, operation flow/algorithmic structure 100 may include, at 105, receiving first UL resource information that includes an indication of a first UL resource in a serving cell of a first hybrid automatic repeat request-acknowledgement (HARQ-ACK), the first HARQ-ACK associated with a first HARQ codebook. Operation flow/algorithmic structure 100 may further include, at 110, receiving second UL resource information that includes an indication of a second UL resource in a serving cell of a second HARQ-ACK, the second HARQ-ACK associated with a second HARQ codebook. Operation flow/algorithmic structure 100 may further include, at 115, storing the first UL resource information and second UL resource information in a memory. Operation flow/algorithmic structure 100 may further include, at 120, based on the first UL resource information and the second UL resource information, performing the second HARQ-ACK transmission using the second resource, and dropping the first HARQ-ACK transmission Another example of an operation flow/algorithmic structure is depicted in FIG. 2, which may be performed by a UE in accordance with some embodiments. In this example, operation flow/algorithmic structure 200 may include, at 205, receiving an indication of a first UL resource in a serving cell of a first hybrid automatic repeat request-acknowledgement (HARQ-ACK), the first HARQ-ACK associated with a first HARQ codebook. Operation flow/algorithmic structure 200 may further include, at 210, receiving an indication of a second UL resource in a serving cell of a second HARQ-ACK, the second HARQ-ACK associated with a second HARQ codebook. Operation flow/algorithmic structure 200 may further include, at 215, determining a first priority associated with the first HARQ-ACK codebook and a second priority associated with the second HARQ-ACK codebook, wherein the first priority is lower than the second priority. Operation flow/algorithmic structure 200 may further include, at 220, based on the first priority being lower than the second priority, performing the second HARQ-ACK transmission using the second resource, and dropping the first HARQ-ACK transmission.

Another example of an operation flow/algorithmic structure is depicted in FIG. 3, which may be performed by a next-generation NodeB (gNB) in accordance with some embodiments. In this example, operation flow/algorithmic structure 300 may include, at 305, generating a first message that includes an indication of a first UL resource in a serving cell of a first hybrid automatic repeat request-acknowledgement (HARQ-ACK), the first HARQ-ACK associated with a first HARQ codebook. Operation flow/algorithmic structure 300 may further include, at 310, Encoding the first message for transmission to a user equipment (UE). Operation flow/algorithmic structure 300 may further include, at 315, generating a second message that includes an indication of a second UL resource in a serving cell of a second HARQ-ACK, the second HARQ-ACK associated with a second HARQ codebook. Operation flow/algorithmic structure 300 may further include, at 320, Encoding the second message for transmission to the UE.

EXAMPLES

Some non-limiting examples are provided below.

Example 1 includes an apparatus of a user equipment (UE) comprising: memory to store uplink (UL) resource information; and processing circuitry, coupled with the memory, to: receive first UL resource information that includes an indication of a first UL resource in a serving cell of a first hybrid automatic repeat request-acknowledgement (HARQ-ACK), the first HARQ-ACK associated with a first HARQ codebook; receive second UL resource information that includes an indication of a second UL resource in a serving cell of a second HARQ-ACK, the second HARQ-ACK associated with a second HARQ codebook; store the first UL resource information and second UL resource information in the memory; and based on the first UL resource information and the second UL resource information, perform the second HARQ-ACK transmission using the second resource, and drop the first HARQ-ACK transmission.

Example 2 includes the apparatus of example 1 or some other example herein, wherein the first codebook has a lower priority than the second codebook.

Example 3 includes the apparatus of example 2 or some other example herein, wherein the first UL resource and the second UL resource overlap in time.

Example 4 includes the apparatus of example 2 or some other example herein, wherein the first UL resource and the second UL resource overlap in frequency.

Example 5 includes the apparatus of example 1 or some other example herein, wherein the processing circuitry is further to: determine that the first UL resource and the second UL resource overlap, and that the second HARQ-ACK transmission is triggered by a second downlink control information (DCI) message and the first HARQ-ACK transmission is triggered by a first DCI message, wherein the first DCI message is to indicate a first priority of the first codebook and the second DCI message is to indicate a second priority of the second codebook, the second priority higher than the first priority; and based further on the determination, perform the second HARQ-ACK transmission using the second resource, and drop the first HARQ-ACK transmission.

Example 6 includes the apparatus of example 5 or some other example herein, wherein the first codebook is part of a first HARQ-ACK codebook group that supports a single physical uplink control channel (PUCCH) transmission with HARQ-ACK within a slot, or supports multiple PUCCH transmissions with HARQ-ACK.

Example 7 includes the apparatus of example 6 or some other example herein, wherein the processing circuitry is further to determine, based on dynamic control information (DCI), that the first HARQ-ACK codebook group has a lower priority than the second HARQ-ACK codebook group.

Example 8 includes one or more non-transitory computer-readable media storing instructions that, when executed by one or more processors, cause a user equipment (UE) to: receive an indication of a first UL resource in a serving cell of a first hybrid automatic repeat request-acknowledgement (HARQ-ACK), the first HARQ-ACK associated with a first HARQ codebook; receive an indication of a second UL resource in a serving cell of a second HARQ-ACK, the second HARQ-ACK associated with a second HARQ codebook; determine a first priority associated with the first HARQ-ACK codebook and a second priority associated with the second HARQ-ACK codebook, wherein the first priority is lower than the second priority; and based on the first priority being lower than the second priority, perform the second HARQ-ACK transmission using the second resource, and drop the first HARQ-ACK transmission.

Example 9 includes the one or more non-transitory computer-readable media of example 8 or some other example herein, wherein the first HARQ-ACK codebook group has a lower priority than the second HARQ-ACK codebook group.

Example 10 includes the one or more non-transitory computer-readable media of example 9 or some other example herein, wherein the first UL resource and the second UL resource overlap in time.

Example 11 includes the one or more non-transitory computer-readable media of example 9 or some other example herein, wherein the first UL resource and the second UL resource overlap in frequency.

Example 12 includes the one or more non-transitory computer-readable media of example 8 or some other example herein, wherein the first codebook is part of a first HARQ-ACK codebook group that supports a single physical uplink control channel (PUCCH) transmission with HARQ-ACK within a slot, or supports multiple PUCCH transmissions with HARQ-ACK.

Example 13 includes the one or more non-transitory computer-readable media of example 8 or some other example herein, wherein the instructions are further to: determine that the first UL resource and the second UL resource overlap, and that the second HARQ-ACK transmission is triggered by a second downlink control information (DCI) message and the first HARQ-ACK transmission is triggered by a first DCI message, wherein the first DCI message is to indicate a first priority of the first codebook and the second DCI message is to indicate a second priority of the second codebook, the second priority higher than the first priority; and based further on the determination, perform the second HARQ-ACK transmission using the second resource, and drop the first HARQ-ACK transmission.

Example 14 includes one or more non-transitory computer-readable media storing instructions that, when executed by one or more processors, cause a next-generation NodeB (gNB) to: generate a first message that includes an indication of a first UL resource in a serving cell of a first hybrid automatic repeat request-acknowledgement (HARQ-ACK), the first HARQ-ACK associated with a first HARQ codebook; encode the first message for transmission to a user equipment (UE); generate a second message that includes an indication of a second UL resource in a serving cell of a second HARQ-ACK, the second HARQ-ACK associated with a second HARQ codebook; and encode the second message for transmission to the UE.

Example 15 includes the one or more non-transitory computer-readable media of example 14 or some other example herein, wherein the first UL resource and the second UL resource overlap, and wherein the media further stores instructions to cause the gNB to: encode a first downlink control information (DCI) message for transmission to the UE, wherein the first DCI message is to trigger a first HARQ-ACK transmission; and encode a second DCI message for transmission to the UE, wherein the second DCI message is to trigger a second HARQ-ACK transmission, and wherein the first DCI message is to indicate a first priority of the first codebook and the second DCI message is to indicate a second priority of the second codebook, the second priority higher than the first priority.

Example 16 includes the one or more non-transitory computer-readable media of example 15 or some other example herein, wherein the first UL resource and the second UL resource overlap in time.

Example 17 includes the one or more non-transitory computer-readable media of example 15 or some other example herein, wherein the first UL resource and the second UL resource overlap in frequency.

Example 18 includes the one or more non-transitory computer-readable media of example 14 or some other example herein, wherein the first codebook is part of a first HARQ-ACK codebook group that supports a single physical uplink control channel (PUCCH) transmission with HARQ-ACK within a slot.

Example 19 includes the one or more non-transitory computer-readable media of example 14 or some other example herein, wherein the first codebook is part of a first HARQ-ACK codebook group that supports multiple PUCCH transmissions with HARQ-ACK.

Example 20 includes the one or more non-transitory computer-readable media of example 18 or some other example herein, wherein the first HARQ-ACK codebook group has a lower priority than the second HARQ-ACK codebook group.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus of a user equipment (UE) comprising:
memory to store uplink (UL) resource information; and
processing circuitry, coupled with the memory, to:
receive first UL resource information that includes an indication of a first UL resource in a serving cell of a first hybrid automatic repeat request-acknowledgement (HARQ-ACK), the first HARQ-ACK associated with a first HARQ codebook;
receive second UL resource information that includes an indication of a second UL resource in a serving cell of a second HARQ-ACK, the second HARQ-ACK associated with a second HARQ codebook;
store the first UL resource information and second UL resource information in the memory;
determine that the first UL resource and the second UL resource overlap, and that the second HARQ-ACK transmission is triggered by a second downlink control information (DCI) message and the first HARQ-ACK transmission is triggered by a first DCI message, wherein the first DCI message is to indicate a first priority of the first codebook and the second DCI message is to indicate a second priority of the second codebook, the second priority higher than the first priority; and
based on the determination, perform the second HARQ-ACK transmission using the second resource, and drop the first HARQ-ACK transmission.

2. The apparatus of claim 1, wherein the first codebook has a lower priority than the second codebook.

3. The apparatus of claim 2, wherein the first UL resource and the second UL resource overlap in time.

4. The apparatus of claim 2, wherein the first UL resource and the second UL resource overlap in frequency.

5. The apparatus of claim 1, wherein the first codebook is part of a first HARQ-ACK codebook group that supports a single physical uplink control channel (PUCCH) transmission with HARQ-ACK within a slot, or supports multiple PUCCH transmissions with HARQ-ACK.

6. The apparatus of claim 5, wherein the processing circuitry is further to determine, based on dynamic control information (DCI), that the first HARQ-ACK codebook group has a lower priority than the second HARQ-ACK codebook group.

7. One or more non-transitory computer-readable media storing instructions that, when executed by one or more processors, cause a user equipment (UE) to:
receive an indication of a first UL resource in a serving cell of a first hybrid automatic repeat request-acknowledgement (HARQ-ACK), the first HARQ-ACK associated with a first HARQ codebook;
receive an indication of a second UL resource in a serving cell of a second HARQ-ACK, the second HARQ-ACK associated with a second HARQ codebook;
determine:
a first priority associated with the first HARQ-ACK codebook and a second priority associated with the second HARQ-ACK codebook, wherein the first priority is lower than the second priority;
that the first UL resource and the second UL resource overlap; and
that the second HARQ-ACK transmission is triggered by a second downlink control information (DCI) message and the first HARQ-ACK transmission is triggered by a first DCI message, wherein the first DCI message is to indicate a first priority of the first codebook and the second DCI message is to indicate a second priority of the second codebook, the second priority higher than the first priority; and
based on the determination, perform the second HARQ-ACK transmission using the second resource, and drop the first HARQ-ACK transmission.

8. The one or more non-transitory computer-readable media of claim 7, wherein the first HARQ-ACK codebook group has a lower priority than the second HARQ-ACK codebook group.

9. The one or more non-transitory computer-readable media of claim 8, wherein the first UL resource and the second UL resource overlap in time.

10. The one or more non-transitory computer-readable media of claim 8, wherein the first UL resource and the second UL resource overlap in frequency.

11. The one or more non-transitory computer-readable media of claim 7, wherein the first codebook is part of a first HARQ-ACK codebook group that supports a single physical uplink control channel (PUCCH) transmission with HARQ-ACK within a slot, or supports multiple PUCCH transmissions with HARQ-ACK.

12. One or more non-transitory computer-readable media storing instructions that, when executed by one or more processors, cause a next-generation NodeB (gNB) to:
  generate a first message that includes an indication of a first UL resource in a serving cell of a first hybrid automatic repeat request-acknowledgement (HARQ-ACK), the first HARQ-ACK associated with a first HARQ codebook;
  encode the first message for transmission to a user equipment (UE);
  generate a second message that includes an indication of a second UL resource in a serving cell of a second HARQ-ACK, the second HARQ-ACK associated with a second HARQ codebook;
  encode the second message for transmission to the UE;
  encode a first downlink control information (DCI) message for transmission to the UE, wherein the first DCI message is to trigger a first HARQ-ACK transmission; and
  encode a second DCI message for transmission to the UE, wherein the second DCI message is to trigger a second HARQ-ACK transmission, and wherein the first DCI message is to indicate a first priority of the first codebook and the second DCI message is to indicate a second priority of the second codebook, the second priority higher than the first priority.

13. The one or more non-transitory computer-readable media of claim 12, wherein the first UL resource and the second UL resource overlap in time.

14. The one or more non-transitory computer-readable media of claim 12, wherein the first UL resource and the second UL resource overlap in frequency.

15. The one or more non-transitory computer-readable media of claim 12, wherein the first codebook is part of a first HARQ-ACK codebook group that supports a single physical uplink control channel (PUCCH) transmission with HARQ-ACK within a slot.

16. The one or more non-transitory computer-readable media of claim 12, wherein the first codebook is part of a first HARQ-ACK codebook group that supports multiple PUCCH transmissions with HARQ-ACK.

17. The one or more non-transitory computer-readable media of claim 15, wherein the first HARQ-ACK codebook group has a lower priority than the second HARQ-ACK codebook group.

* * * * *